US009538265B2

(12) United States Patent
Kanonakis

(10) Patent No.: US 9,538,265 B2
(45) Date of Patent: Jan. 3, 2017

(54) LOSSLESS AND LOW-DELAY OPTICAL BURST SWITCHING USING SOFT RESERVATIONS AND OPPORTUNISTIC TRANSMISSION

(71) Applicant: NEC Laboratories America, Inc., Princeton, NJ (US)

(72) Inventor: Konstantinos Kanonakis, New Brunswick, NJ (US)

(73) Assignee: NEC Corporation (JP)

( * ) Notice: Subject to any disclaimer, the term of this patent is extended or adjusted under 35 U.S.C. 154(b) by 96 days.

(21) Appl. No.: 14/612,933

(22) Filed: Feb. 3, 2015

(65) Prior Publication Data

US 2015/0222970 A1    Aug. 6, 2015

Related U.S. Application Data

(60) Provisional application No. 61/935,437, filed on Feb. 4, 2014.

(51) Int. Cl.
*H04J 14/00* (2006.01)
*H04Q 11/00* (2006.01)
*H04J 14/02* (2006.01)

(52) U.S. Cl.
CPC ....... *H04Q 11/0066* (2013.01); *H04J 14/0256* (2013.01); *H04J 14/0267* (2013.01);
(Continued)

(58) Field of Classification Search
CPC ............ H04Q 11/0066; H04Q 11/0005; H04Q 2011/0064; H04Q 2011/005; H04Q 2011/0016; H04Q 2011/0086; H04Q 2011/0088; H04J 14/0275; H04J 14/0256; H04J 14/0267
(Continued)

(56) References Cited

U.S. PATENT DOCUMENTS

| 6,721,315 | B1* | 4/2004 | Xiong | H04L 49/254 370/389 |
| 2005/0063701 | A1* | 3/2005 | Ovadia | H04Q 11/0066 398/45 |

(Continued)

OTHER PUBLICATIONS

Angelopoulos, et al., "Slotted Optical Switching with Pipelined Two-Way Reservations", Journal of Lightwave Technology, Oct. 2006, vol. 24, No. 10, pp. 3616-3624.

(Continued)

*Primary Examiner* — Juan A Torres
(74) *Attorney, Agent, or Firm* — Joseph Kolodka

(57) ABSTRACT

Systems and methods for optical switching of time-varying traffic, including generating fixed-length bursts using one or more Optical Edge Nodes (OENs). The bursts are temporarily stored in electrical buffers located at the OENs, wherein the electrical buffers include one or more burst queues, and one burst queue is allocated for each of one or more destination OENs. The OENs are interconnected using one or more Optical Switching Nodes (OSNs). A control protocol is implemented to establish and remove soft reservations using at least one of the OENs and OSNs, optical channels are reserved for a duration long enough to transmit one or more data bursts, the duration being selected independently for each of the one or more burst queues, the control protocol gives precedence to avoiding disrupting of any existing soft reservations when reserving resources; and the soft reservations are capable of being reused until overridden.

18 Claims, 6 Drawing Sheets

(52) U.S. Cl.
CPC ...... *H04J 14/0275* (2013.01); *H04Q 11/0005* (2013.01); *H04Q 2011/005* (2013.01); *H04Q 2011/0016* (2013.01); *H04Q 2011/0064* (2013.01); *H04Q 2011/0086* (2013.01); *H04Q 2011/0088* (2013.01)

(58) Field of Classification Search
USPC .......................................................... 398/45
See application file for complete search history.

(56) References Cited

U.S. PATENT DOCUMENTS

| | | | | |
|---|---|---|---|---|
| 2005/0078666 A1* | 4/2005 | Beshai | ................... | H04L 45/62 370/380 |
| 2005/0135806 A1* | 6/2005 | Mishra | ............... | H04L 12/5601 398/45 |
| 2006/0209849 A1* | 9/2006 | Rodrigo | ............. | H04Q 11/0066 370/401 |
| 2008/0232809 A1* | 9/2008 | Beshai | ................... | H04L 12/56 398/98 |
| 2013/0188652 A1* | 7/2013 | Beshai | ............... | H04Q 11/0066 370/410 |

OTHER PUBLICATIONS

Hsu, et al., "Performance Analysis of Deflection Routing in Optical Burst-Switched Networks", IEEE INFOCOM, Twenty-First Annual Joint Conference of the IEEE Computer and Communications Societies, Jun. 2002, vol. 1, pp. 66-73.

Patel, et al., "QoS-Aware Optical Burst Switching in OpenFlow Based Software-Defined Optical Networks", ONDM, Apr. 2013, pp. 275-280.

Qiao, et al., "Optical Burst Switching (OBS)—A New Paradigm for an Optical Internet," Journal of High Speed Networks, vol. 8, No. 1, Mar. 1999, pp. 1-23.

Zhang, et al., "Analysis of TCP Over Optical Burst-Switched Networks with Burst Retransmission", IEEE Globecom, Global Telecommunications Conference, Dec. 2005, vol. 4, pp. 1979-1983.

Zhang, et al., "Evaluation of Burst Retransmission in Optical Burst-Switched Networks",Broadband Networks, IEEE Broad Nets 2005. 2nd International Conference, Oct. 2005, pp. 297-303.

* cited by examiner

LOSSLESS AND LOW-DELAY OPTICAL BURST SWITCHING USING SOFT RESERVATIONS AND OPPORTUNISTIC TRANSMISSION

RELATED APPLICATION INFORMATION

This application claims priority to provisional application Ser. No. 61/935,437, filed on Feb. 4, 2014, incorporated herein by reference.

BACKGROUND

Technical Field

The present invention relates to optical burst switching, and more particularly, to lossless and low-delay optical burst switching using soft reservations and opportunistic transmission.

Description of the Related Art

The rapid growth of internet traffic triggered by the emergence of new application, services, networking, paradigms and means of user connectivity is imposing ever-increasing demands on the network core. Despite the high-capacity offered by existing optical network backbones adopting wavelength division multiplexing WDM), it is evident that novel advances are required in order to keep up with the simultaneous increase in volume, diversity and dynamicity of traffic demands. Current optical core networks largely follow the traditional circuit switching approach for handling optical network resources. Under this paradigm optical circuits are formed, whereby resources (i.e. wavelengths) are reserved until explicitly torn down. The advantage of this approach is guaranteed performance, but this is achieved only under the premise of gross overprovisioning. Moreover, bursty traffic patterns cannot be handled by existing systems and methods, since resources are reserved for a connection even if there is no data actually transmitted—while other connections throughout the network might be in need of additional resources. The end result is poor network utilization and an inadequacy to support emerging services.

Several years ago, the Optical Burst Switching (OBS) concept was proposed for WDM optical networks in order to address the aforementioned issues. The main premise of OBS is the separation of control from data: A dedicated control channel ($\lambda_0$) is reserved network-wide for carrying the so-call Burst Header Packets (BHPs). At the edge of the network, data traffic (e.g. coming from an IP router) is aggregated at an Optical Edge Node (OEN). Once a burst (e.g., consisting of a large number of packers) is assembled, the OEN creates a BHP carrying all necessary information to reserve the resources for the upcoming burst across all intermediate Optical Switching Nodes (OSN). The latter are basically optical cross-connects (OXCs) which also comprise a controller handling BHPs and performing burst scheduling based on the information extracted from them, with the help of a local scheduling log indicating already reserved resources for upcoming bursts.

In other words, the BHPs follow the same path that the actual burst will do and try to reserve resources in advance at each core node for a limited, duration, sufficient to receive and forward the burst. OBS manages to eliminate the need for buffering at intermediate core nodes (i.e. OSN), since reservations are made in advance for each burst. The latter is transmitted following a predetermined offset time after the BHP departure (enough to account for the BHP Optical-Electrical-Optical (O-E-O) conversions and electrical processing) and can then travel all-optically across the optical network. However, currently, OBS presently includes the very significant drawback of extreme burst loss even at a low network load.

SUMMARY

A method for optical switching of time-varying traffic, including generating fixed-length bursts using one or more Optical Edge Nodes (OENs). The bursts are temporarily stored in electrical buffers located at the OENs, wherein the electrical buffers include one or more burst queues, and one burst queue is allocated for each of one or more destination OENs. The OENs are interconnected using one or more Optical Switching Nodes (OSNs). A control protocol is implemented to establish and remove soft reservations using at least one of the OENs and OSNs, optical channels are reserved for a duration long enough to transmit one or more data bursts, the duration being selected independently for each of the one or more burst queues, the control protocol gives precedence to avoiding disrupting of any existing soft reservations when reserving resources; and the soft reservations are capable of being reused until overridden.

A system for optical switching of time-varying traffic, including one or more Optical Edge Nodes (OENs) configured to generate, using a processor, fixed-length bursts and one or more burst queues. One or more electrical buffers located, at the OENs are configured to temporarily store the bursts, wherein the electrical buffers include one or more burst queues, and one burst queue is allocated for each of one or more destination OENs. One or more Optical Switching Nodes (OSNs) are configured to interconnect the OENs. One or more controllers are configured to implement a control protocol for establishing and removing soft reservations using at least one of the OENs and OSNs, wherein optical channels are reserved for a duration long enough to transmit one or more data bursts, the duration being selected independently for each of the one or more burst queues, wherein the control protocol gives precedence to avoiding disrupting of any existing soil reservations when reserving resources; and wherein the soft reservations are capable of being reused until overridden.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
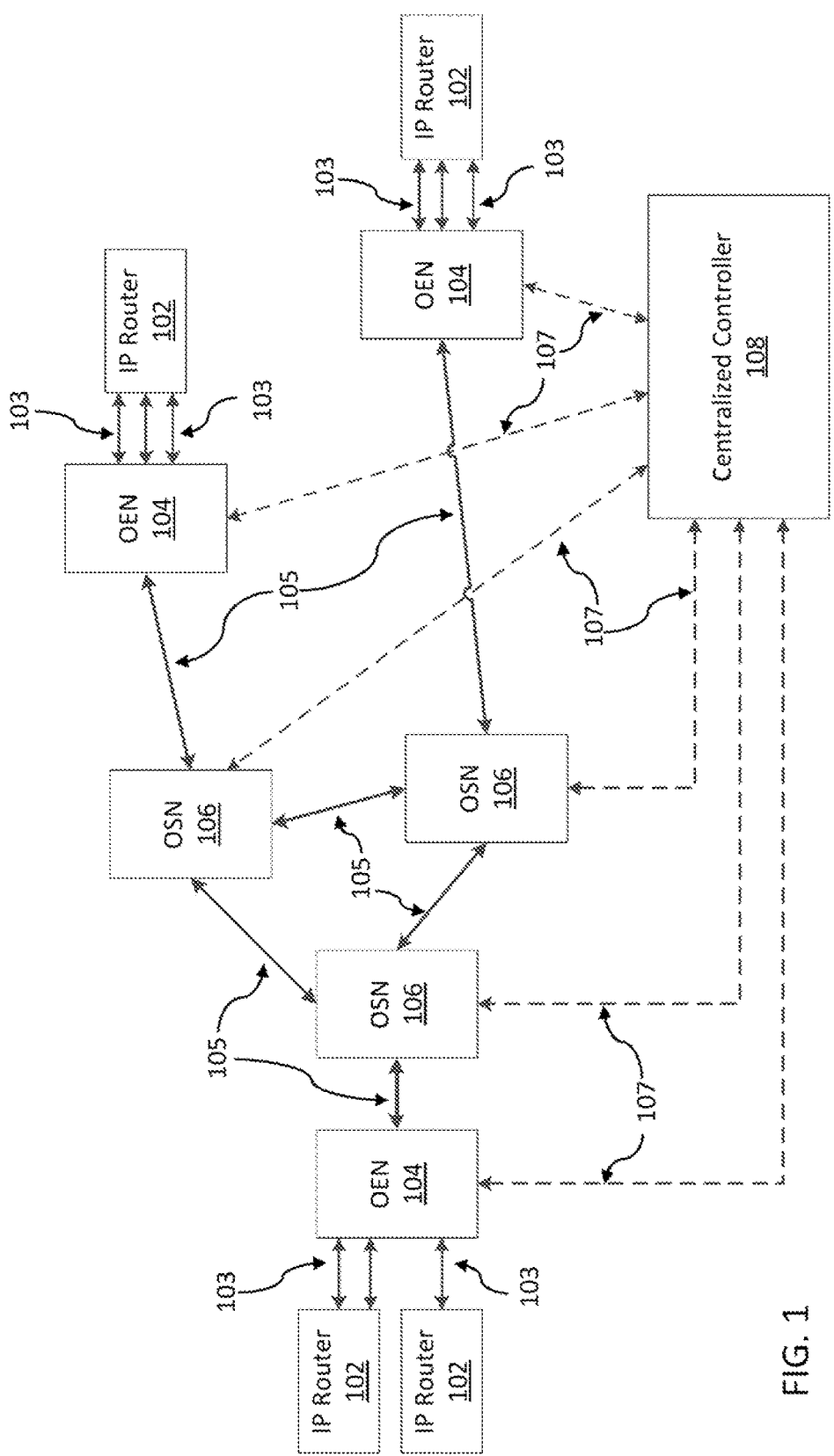
FIG. 1 is a block/flow diagram illustratively depicting an Optical Burst Switching (OBS) network architecture in accordance with the present principles.

In accordance with the present principles, systems and methods are provided for lossless and low-delay optical burst switching (OBS) with increased resource utilization using soft reservations and opportunistic transmission. In one embodiment, the present principles introduce a novel control framework suitable for OBS networks of any scale, which solves the aforementioned issues related to conventional all-optical burst switching, schemes. First, in contrast to the conventional OBS systems and other schemes, the present principles avoid burst loss by adopting, a reservation-based control mechanism and taking advantage of the abundance of electrical buffering at the edges of the optical network.

Furthermore, in contrast to conventional schemes making use of negative acknowledgements, the present principles may be employed in a manner in which partly reserved resources may be released, and may be reused by other bursts whenever an end-to-end reservation fails, hi contrast to traditional circuit switching, a novel soft reservation based concept is also introduced, which may allow flexibly adjusting the trade-off between guaranteed burst delivery and efficient resource utilization through statistical multiplexing. This may be achieved by selecting the duration of soft reservations according to the desired performance according to the present principles.

In one embodiment, in contrast to all conventional OBS schemes (both one- and two-way reservation based), the present principles introduce the concept of opportunistic transmission which may allow reusing expired soft reservations in order to transmit bursts at no control-related delay. This may avoid even the offset time required by typical OBS, which may be significant especially if OXC reconfiguration times are high (which is the case for existing systems and methods). The latter feature may also result in reduced average electrical buffer utilization at edge nodes. When transmitting opportunistically, loss may be avoided by adopting a sophisticated retransmission scheme, however in contrast to conventional OBS retransmission mechanisms, the present principles may ensure that no out-of-order bursts are received at the destination, thus eliminating higher layer delay, throughput and buffering issues. It is noted that both the soft reservation lifetime, as well as the opportunistic transmission parameters may be adapted on-the-fly, either manually or automatically (e.g., based on real-time network statistics), resulting in a highly flexible framework which may be tailored to the network operator demands.

Indeed, the present principles may provide lossless all-optical burst switching combining high network utilization with reduced burst delay and reduced electrical buffering requirements, while avoiding the issue of out-of-order burst delivery. The present principles may be employed to achieve all-optical switching of time-varying traffic, consisting of fixed-length data packets (e.g., "bursts"), wherein each of them encapsulates multiple individual user packets.

Figure 2:
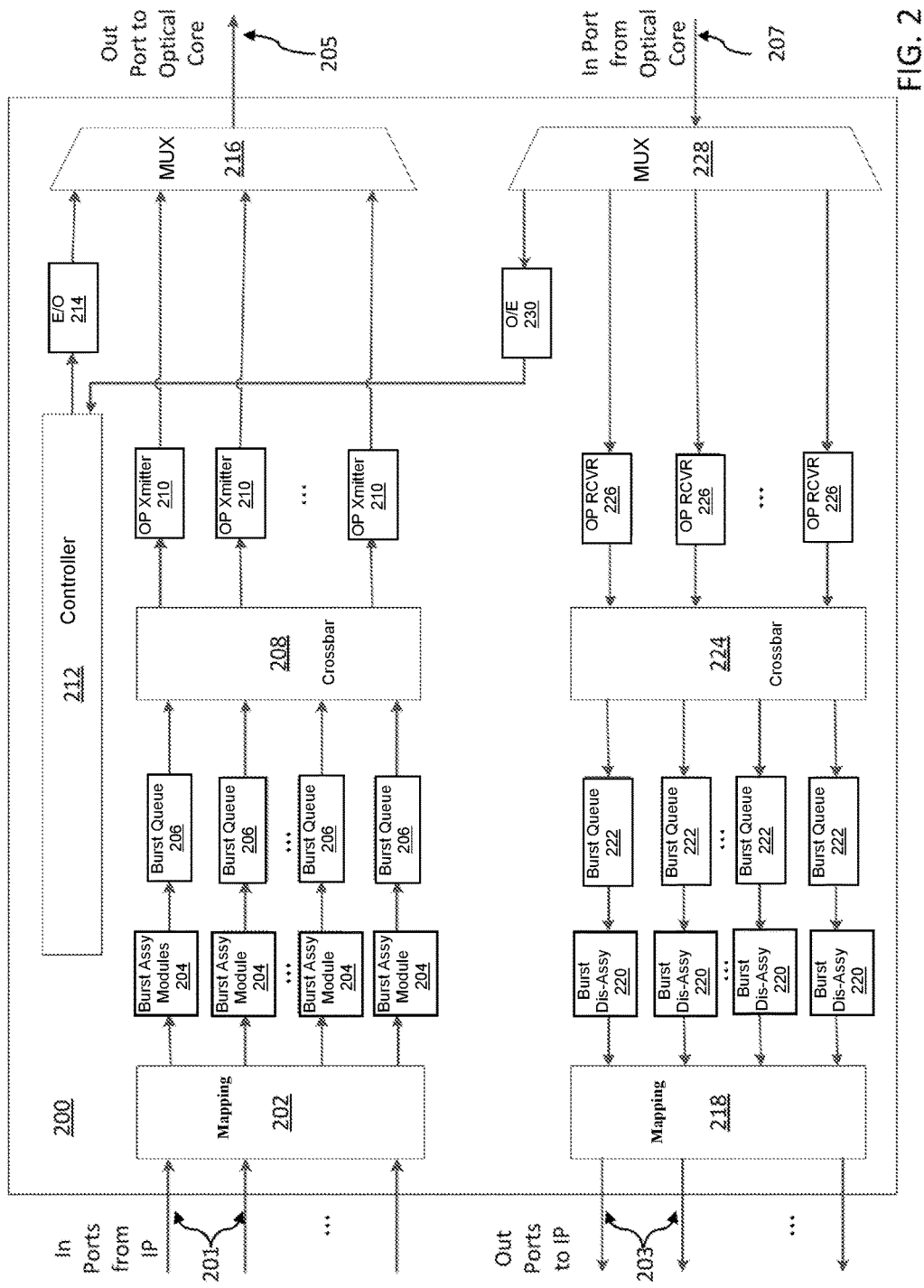
FIG. 2 is a block/flow diagram illustratively depicting a high-level view of a generic Optical Edge Node (OEN) network architecture in accordance with the present principles.
Figure 3:
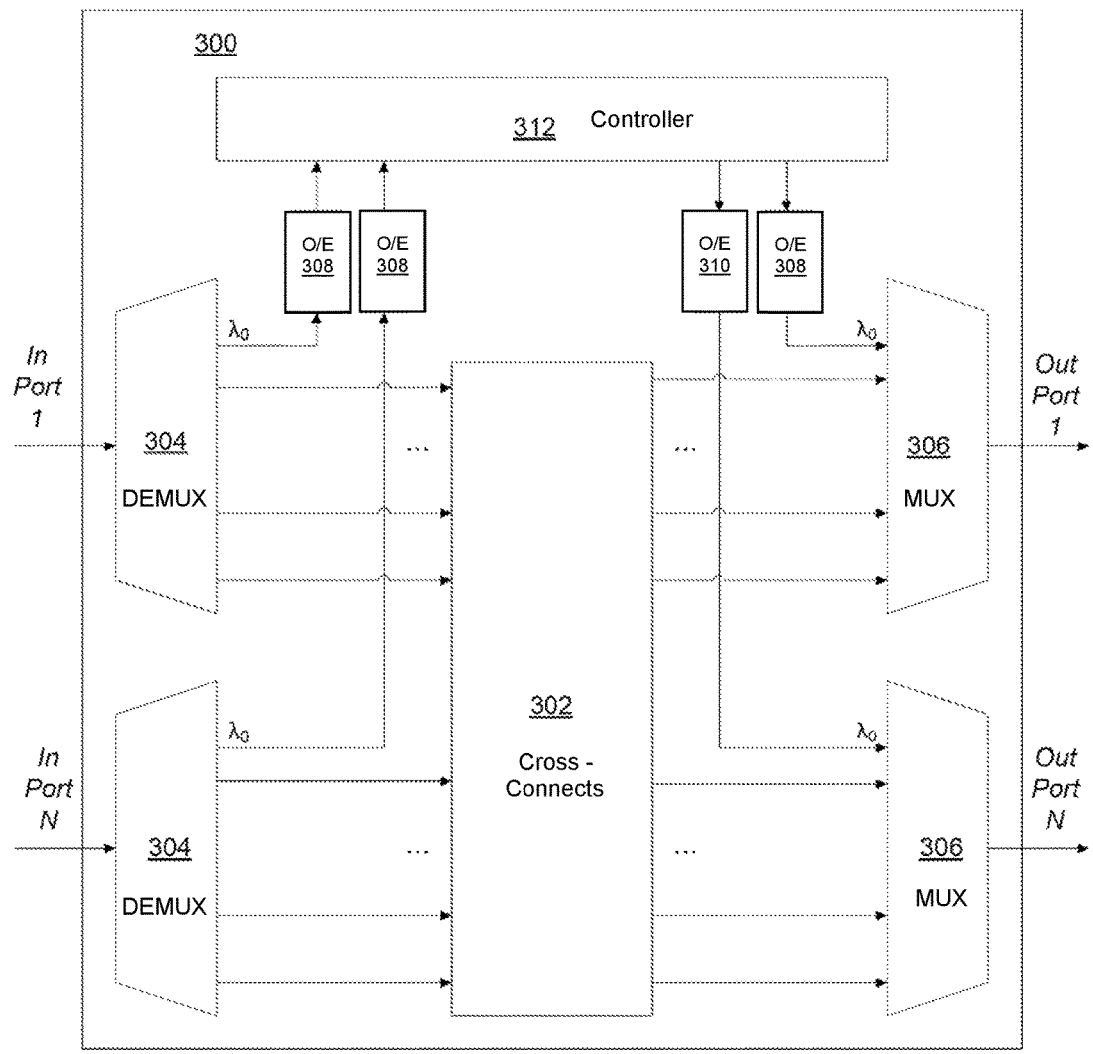
FIG. 3 is a block/flow diagram illustrating a high-level view of a generic Optical Switching Node (OSN) in accordance with the present principles.

The present principles may be applied to various systems, including systems with the following features: The fixed-length bursts may be generated by Optical Edge Nodes (OEN) and temporarily stored in electrical buffers located at the OEN nodes, with one queue per destination OEN, and the OEN nodes may be interconnected via Optical Switching Nodes (OSN). The latter does not possess electrical buffering, but may employ optical buffering and/or may have wavelength conversion capabilities. Both OEN and OSN nodes can process electronically a predefined optical channel used for exchanging control information. Also, both OEN and OSN nodes may be assumed to implement algorithms and data structures for scheduling upcoming bursts. The generic structure of the OEN and OSN nodes is depicted in FIGS. 2 and 3, respectively. OEN and OSN nodes may optionally be connected with one or more centralized controllers which can provide network-wide information (such as routing-related) and/or statistics.

In one embodiment, each burst queue of each OEN alternates between three possible states, hereby referred to as "Guaranteed Transmission", "Opportunistic Transmission" and "No Transmission", which determine the capability of the OEN to transmit bursts belonging to the particular queue. The OEN and OSN nodes may also implement a control protocol for establishing and tearing down so called "soft reservations". The aforementioned control protocol may comprise the set of control messages that will be described below, and may implement the functionality according the present principles.

In one embodiment, so called REQ messages may be employed, each of which may reserve optical channels across an optical network path for a duration long enough to transmit one or multiple data bursts. This time duration may be a system parameter which may be chosen independently for each burst queue of each OEN. The OEN can use the time window specified by the corresponding reservation to transmit bursts that are guaranteed to be delivered successfully at the destination OEN. It is noted that when a REQ message fails to reserve resources at an OSN node along its path, a so called NACK message may be created towards the source OEN node of the connection, which may trigger the removal of previously established reservations by the aforementioned REQ message in each of the preceding OSN nodes. Whenever a REQ message succeeds in reserving resources across the whole path, a so called ACK message may be sent instead, and upon its reception by the connection source OEN the corresponding reservation may be marked as "acknowledged".

In one embodiment according, to the present principles, a control protocol at the OEN and OSN may be employed to give precedence to reserving resources without disrupting, any existing soft reservations. However, if this is not possible, one or more existing soft reservations may be removed as a result of a new reservation, under the condition that their end time is higher than the current time (e.g., they have "expired"). It is noted that if the aforementioned condition is not met, an existing reservation will not be removed as a result of a new reservation. In one embodiment, for each so called "expired" reservation which overlaps with a newly established reservation, a RELEASE message may be sent, both towards the source and the destination OEN of the connection corresponding to the former reservation. Such a message may trigger the removal of the reservations associated with the same connection across all intermediate OSN nodes in its path.

In one embodiment, an OEN node may decide to transmit a burst so called "opportunistically" (e.g., later than the time window specified by an existing reservation and the decision may be determined by a Boolean system parameter which may be different for each destination. Whenever this parameter is "true", opportunistic transmission may be allowed. The parameter may be calculated as a function of the expected burst contention towards the specific destination, and may thus be modified during system operation, with the general guideline being that opportunistic transmission should be allowed when the expected burst contention is below a certain threshold. It is noted that a copy of each opportunistically transmitted burst may be kept at the corresponding burst queue and may remain in the queue for enough time to eliminate the possibility of a RELEASE message arriving for the connection corresponding to the reservation which was used by the burst.

In one embodiment, an OEN, upon receiving a RELEASE message, may calculate the number of opportunistically transmitted bursts that have failed and accordingly may unmark their copies in its local queue so that they can be either retransmitted or trigger new reservations, according to the current transmission state of the queue. Furthermore, fixed-length burst packets may be employed for each destination OEN, thus decoupling a reservation from the particular burst that triggered it. This feature allows maintaining burst FIFO order, and thus may eliminate the effect of out-of-order burst delivery and reduce burst delay jitter in the case of occasional failed reservations.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include, a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to FIG. 1, a block/flow diagram illustratively depicting an Optical Burst Switching (OBS) network architecture is shown in accordance with one embodiment of the present principles. In one embodiment, a conventional optical network may be employed, and the optical network may include two types of nodes. These nodes may include one or more OBS Edge Nodes (OEN) 104 and/or one or more OBS Switch Nodes (OSN) 106. It may be assumed that each node may be associated with an identifier which is unique in the current OBS network domain. An optional centralized controller 108, which may be connected with the optical network nodes via secure connections 107 (e.g., using the Transport Layer Security (TLS) protocol) may be used in certain embodiments. The main purpose of such a controller would be to collect and distribute network-wide information and statistics, which can be used to update routing and/or optimally decide and distribute control parameters. However, its use is optional, since the aforementioned functionalities can also be achieved by distributed control signaling.

In this embodiment, traffic may be generated by one or more IP routers 102, which may be interconnected with the OEN nodes via one or more Ethernet links 103. One or more links 105 interconnecting OEM 104 and OSN 106 nodes may be optical WDM links 105, which may be used to carry bursts. It may be assumed that a burst is carried over a single WDM channel (e.g., Fixed- or Flexible-Grid) for a limited duration. A dedicated control channel ($\lambda_0$) in each link may carry Control Message Packets (CMP) (not shown), which can belong to any of several types (as will be discussed in more detail below), and the exact CMP type may be indicated in a relevant packet field. In certain embodiments of the invention, channel $\lambda_0$ may have lower effective capacity than data channels. One reason for the lower effective capacity may be that it may employ a reduced baud rate, enhanced FEC and/or lower modulation level in order to make it more robust against transmission errors.

Referring now to FIG. 2, a block/flow diagram illustratively depicting a high-level view of a generic OEN architecture 200 is shown in accordance with the present principles. In one embodiment, packets received from an IP router side may be classified according to the destination OEN they correspond to. In ports from IP 201 may be received by the OEN 200, and destination OEN-based packet mapping may be employed in block 202. Several individual packets may then be encapsulated into larger burst packets using one or more burst assembly modules 204 which may be stored in electrical burst queues 206 (e.g., FIFO burst queues), corresponding to their destination OEN. Any burst assembly mechanism is possible, under the assumption that the burst sizes produced for each destination OEN may all be equal.

Whenever a burst needs to be transmitted, an electrical crossbar 208 may direct it to a free optical transmitter (Tx) 210, which may use the optical channel associated with the corresponding connection, as will be discussed in further detail below. Multiple channels produced by several optical Tx modules, along with the control channel $\lambda_0$ may be multiplexed using one or more wavelength division multiplexers (WDMs) 216 and sent to the optical core network. In one embodiment, an electrical/optical (E/O) conversion mechanism may be employed in block 214, and an out port to an optical core may be employed in block 205. The control of all OEN modules as well as all decisions regarding burst queue management, burst scheduling and CMP message handling may be performed by a local controller 212.

In one embodiment, the inverse procedures may be followed in the opposite direction (e.g., from the optical core to the IP network). One or more in ports 207 from one or more OSN nodes may send signals to be received by one or more WDM demultiplexers 228, and the signals corresponding to the control channel may pass through an optical/electrical (O/E) conversion mechanism in block 230. One or more optical receivers may be employed in block 226, and an electrical crossbar may be employed in block 224. A signal may pass through Electrical Burst Queues (e.g., FIFO burst queues) 222, may be disassembled by one or more burst disassembly mechanisms 220, may be mapped by one or more destination-based packet mappers in block 218, and may employ out ports to IP in block 203.

Referring now to FIG. 3, a high-level view of a generic Optical Switching Node (OSN) 300 is illustratively depicted in accordance with one embodiment of the present principles. In one embodiment, incoming optical signals either from other OSN or from OEN nodes) may be WDM demultiplexed by one or more WDM demultiplexers 304 and then, by employing one or more reconfigurable optical cross-connects (OXC) 302, each wavelength may be directed to one of the outgoing optical ports, where it may be WDM multiplexed by a WDM multiplexer 306 along with several other channels, and then may be sent to either another OSN or an OEN.

In one embodiment, the signals may be passed through O/E conversion mechanisms in block 308 before passing through a local controller 312, and then passed through E/O conversion mechanisms in block 310. The control channel $\lambda_0$ from each incoming port is convened into the electrical domain and processed by a local controller (which performs all control of OSN modules and also handles CMP messages and burst scheduling). The inverse procedure takes place for the opposite direction. It is noted that the above architecture is illustrative of one embodiment, and is provided here as a baseline. It should be noted that certain embodiments of the present principles could make use of enhanced architectures (e.g. ones using full or limited wavelength conversion capability and/or FDL units).

Figure 4:
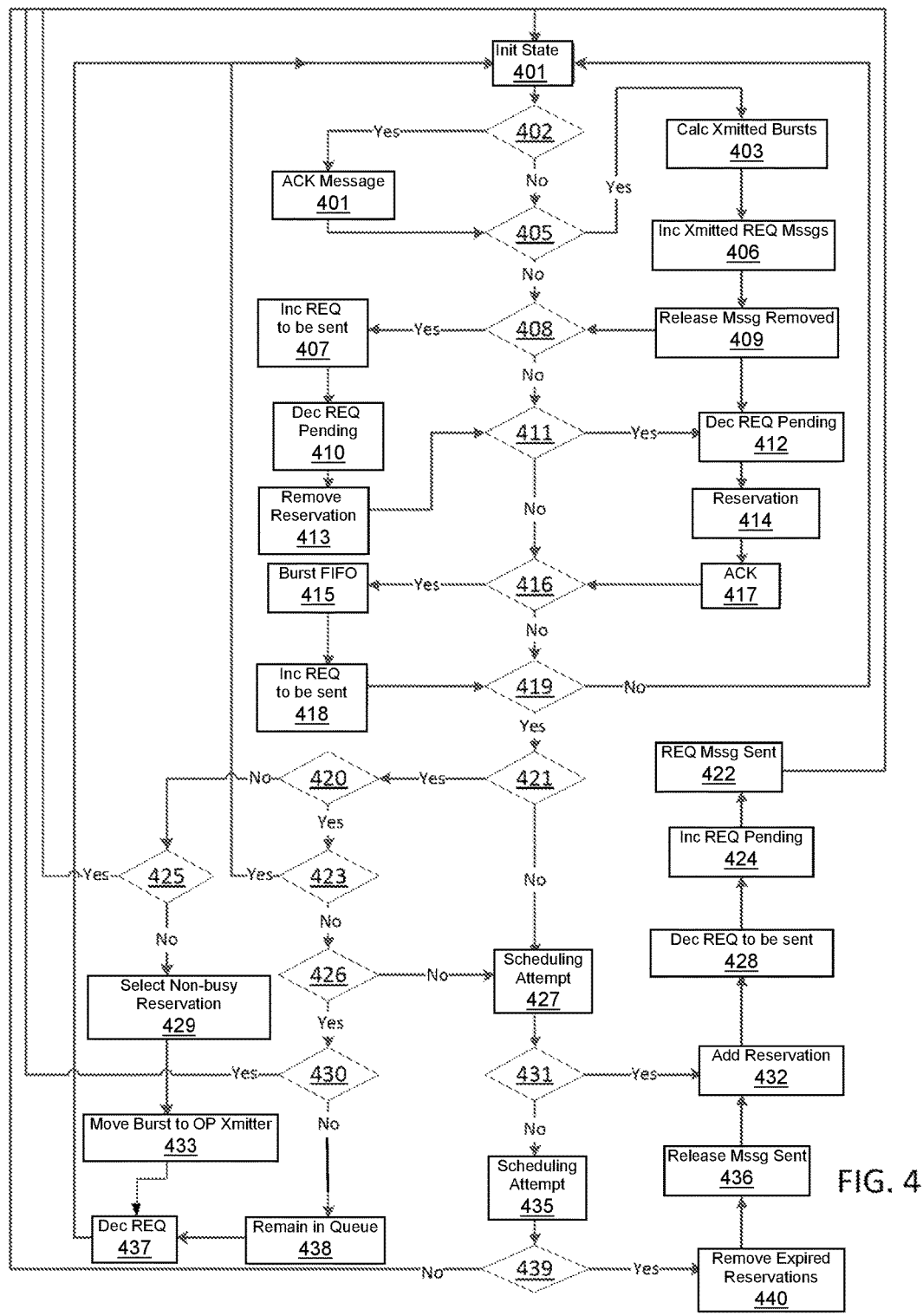
FIG. 4 is a block/flow diagram illustrating the operation of an Optical Edge Node (OEN) in accordance with the present principles.

Referring now to FIG. 4, a block flow diagram of the operation of an OEN Node is illustratively depicted in accordance with one embodiment of the present principles. Before discussing the flow chart in detail, a high level discussion of one embodiment of the present principles will be outlined herein below for ease of understanding.

In one embodiment, some basic CMP message types required by the control scheme according to the present principles may be the following: REQ, ACK, NACK and RELEASE. In one embodiment, REQ messages may be sent by a source OEN to the destination OEN in order to request establishment of a soft connection, ACK/NACK messages may be employed to indicate to the source OEN whether the REQ has been successful or not, respectively. ACK messages may be generated and sent by the destination OEN back to the source OEN, when the former receives the REQ message, while NACK ones may be created and sent by an OSN along the REQ message path, where burst scheduling failed to succeed. All intermediate OSN nodes may forward ACK/NACK messages back to the source OEN. When a NACK is received, an OSN/OEN node may remove the corresponding reservation from its list.

In one embodiment, as it will be explained in detail below, RELEASE messages may be generated by an OSN, whenever a REQ message reuses the resources that correspond to one or more previously made connections. In that case, the OSN may propagate RELEASE messages corresponding to the involved connections in both directions (e.g., both towards the destination and source OEN of each connection) so that reservations may be removed from all intermediate OSN nodes. It is noted that routing according to the present principles may be assumed to be predetermined and fixed, and could be performed either using existing distributed protocols, or at a centralized controller.

For the purposes of routing CMP messages across the network, an additional pair of CMP source/destination identifiers may be employed according to the present principles. These may or not be the same as the connection source/destination identifiers, which may be used to associate a CMP with an OEN-to-OEN (e.g., unidirectional) connection. For example, the CMP and connection source/destination identifiers may be the same in the case of a REQ message (e.g., which originates from the source OEN and is destined to the destination OEN of the corresponding connection), but may be different in the case of a NACK message. The latter may have as CMP source the OEN at which scheduling failed, while its CMP destination OEN may be the connection source OEN (e.g., since the NACK is traveling backwards to inform about the failed connection establishment attempt). For the remainder of the text, whenever it is not explicitly stated otherwise, "source/destination OEN" may refer to the connection source/destination OEN.

It is noted that according to the present principles, each connection (and the associated reservations at each node) may be associated with an identifier, which may also be unique in the current OBS network domain. For example, in one embodiment of the present principles, connection identifiers may be obtained by combining the connection source and destination OEN identifiers (e.g. s, d, respectively) and the burst identifier (e.g. x) of the burst that caused the initial REQ transmission. We will hereafter make this assumption and denote the connection identifier in this case as (s:d:x).

It is noted that in one embodiment, the following fields are necessary in all CMP messages:
  Message type
  CMP Source OEN identifier
  CMP Destination OEN identifier
  Connection Source OEN identifier
  Connection Destination OEN identifier
  Burst identifier
In one embodiment, REQ messages additionally require at least the following fields:
  Incoming channel (which, for example, may be expressed using two integers {n, m}, corresponding to the channel location and width respectively)
  Start time
  End time
It is further noted that different and/or additional fields may be needed depending on the exact scheduling mechanism employed in a particular embodiment of the present principles. It is stressed though that the actual method for scheduling each burst need not be specified by the present principles, since scheduling may be based on any conventional schemes already proposed in the relevant OBS literature. However, the present principles may assume that a scheduling mechanism is in place and the proposed control scheme operates based on the scheduling outcome (either successful or not). Moreover, it is assumed that both OEN and OSN local controllers maintain lists with already established reservations.

In one illustrative embodiment, each reservation may be assumed to include at least the following information:
  Incoming port
  Outgoing port
  Incoming channel
  Outgoing channel
  Reservation Start time Reservation End time
Connection identifier (see above)
Reservation state
Expiration flag
Current service start time
Current service end time In one embodiment, a reservation may be at any time in one of the following two states. A reservation may be "Pending", in which case a REQ has been sent for the corresponding connection, but no ACK has been received, or a reservation may be "Acknowledged", in which case an ACK has been received for the corresponding connection. When a reservation is "acknowledged", but the end time of the reservation minus the duration of a burst exceeds the current time, then the expiration flag may be set for the reservation and it may be considered as "expired". It is noted that in contrast to conventional schemes, reservations may not be removed, after expiring, but may remain in the list until they are explicitly released, as will be discussed in further detail below. It is further noted that the expiration flag may be ignored for pending reservations according to the present principles.

It is noted that since burst sizes for each queue may be equal in one embodiment, it is possible to transmit the burst at the head of the FIFO whenever a burst transmission is instructed by the controller, regardless of whether the establishment of the connection used was originally triggered by another burst. This results in avoiding out-of-order transmissions (e.g., FIFO order is preserved), while burst delay jitter is reduced. Therefore, any burst originating from OEN s and destined to OEN d can potentially use connection s:d:x.

In one embodiment, with respect to burst transmission capability, each queue can at any time be in one out of the following three states. A first state may be "No transmission". In this state, no acknowledged reservation has been made for the queue and hence it is not possible to transmit any bursts. However, there are as many pending reservations, as the number of "original" bursts in the burst FIFO queue.

A second state may be "Guaranteed transmission". In this state, at least one acknowledged and non-expired reservation may exist for the queue. Any bursts that arrive while being at this state, may be transmitted whenever one of the aforementioned reservations becomes free (e.g., no other burst is using it), and are guaranteed to be received at the destination OEN, since the resources have already been reserved. It is noted that even if all acknowledged and non-expired reservations are busy (e.g., currently used for the transmission of another burst, as indicated by the current service start time and current service end time), the queue may still be considered to be in the "guaranteed" state, and it may be attempted to transmit any pending bursts in the queue as soon as one of the aforementioned reservations becomes available again.

A third state may be "Opportunistic transmission". In this state, no "acknowledged" and non-"expired" reservation exists, but there may be at least one "acknowledged" and "expired" reservation for the queue, and no reservations are "pending". While being at this state, the OEN may transmit bursts if a queue-specific system Boolean parameter, which may be denoted as opp_tx_enabled is "true". The transmitted bursts may not be guaranteed to be received at the destination OEN, since the connection may have already been overridden by a later one, or this may even happen after the transmission of the burst. For this reason, copies of the bursts sent while being at this state may remain at the FIFO and the bursts may be marked accordingly.

In one embodiment, each burst in the FIFO queues may belong to one of the following categories (and may be marked accordingly by the OEN controller during the operation of the scheme). A first category may be "Copy", in which a copy of a burst that has been transmitted opportunistically is stored. Once a burst is marked as a "copy", a timer may be set and the burst may be removed from the queue if an associated RELEASE is not received within a certain time interval, as it will be explained in further detail below. A second category may be "Original". This category may include bursts that have just been assembled, burst copies that were unmarked after the reception of a RELEASE message (and hence will eventually need to be retransmitted), or bursts that have not yet been transmitted, but have triggered the transmission of a REQ message, a response for which is still pending.

It is noted that for simplicity, all descriptions in FIG. 4 refer to a specific destination OEN. The flow chart includes the basic checks and actions that may be performed by the OEN controller and is presented here as an infinite loop starting from an "Init" state 401. All variables used may be assumed to be initialized to zero before entering the loop.

In one embodiment, it may first be checked 402 if a REQ message has been received. If yes, this may mean that the corresponding connection has already been successfully set up across the whole path from source to destination, and, hence, the controller may create an ACK message and may send it towards the connection source OEN 404. It may then be checked 40 whether a RELEASE message has been received. If this is the case, based on the arrival time of the RELEASE message and the local statistics kept regarding bursts already transmitted, the controller may calculate 403 the number of transmitted bursts that are bound to fail (or have already failed) as a result of the released connection and may save it in the bursts_piled variable. At the same time, the corresponding bursts in the burst FIFO queue may no longer marked as "copies".

Next, in one embodiment, the number of REQ messages to be transmitted (e.g., denoted by the variable req_to_be_sent) may be incremented 406 by a number of failed bursts (bursts_failed) that was calculated earlier, and the reservation for the connection indicated in the RELEASE message may be removed 409. Then, it may be checked 408 whether a NACK message has been received. If yes, then req_to_be_sent may be incremented by one 407, the req_pending variable may be decremented by one 410, and the reservation for the connection indicated in the RELEASE message may be removed 413.

The next check may be whether an ACK message has arrived 411. If yes, then req_pending (which may indicate the number of REQ messages currently on their way to the specific destination) may be decremented by one 412, the corresponding optical transmitter may be set (or scheduled to be set at some later point) as dictated by the reservation 414, and the reservation corresponding to the connection indicated by the ACK may be marked as "acknowledged" 417. If a new burst has been assembled 416, the burst may be inserted at the tail of the corresponding burst FIFO 415, and the variable req_to_be_sent may be incremented by one 418. At this point it noted that in one embodiment, each original burst in the queue may either be transmitted (in a guaranteed manner or opportunistically) or may trigger a REQ transmission according to the present principles.

In one embodiment, after all the aforementioned checks are finished, it may be checked 419 whether the req_to- _be_sent variable is larger than zero—indicating that either a REQ needs to be sent, or a burst needs to be transmitted. If no, then no further actions may be required at this point. If yes, then it may be first checked 421 if at least one acknowledged reservation exists for the examined destination. If yes, then it may be further checked 420 as to whether all acknowledged reservations have expired. If no, then this may mean that the queue is in the "guaranteed transmission" state and it may be then further checked 425 as to whether all acknowledged and non-expired reservations are busy for the duration of one burst. If no, one of the acknowledged, non-expired and non-busy reservations may be selected 429, and the burst from the head of the FIFO queue may be moved to the optical transmitter indicated by the reservation 433 (e.g., in order to be transmitted towards the optical core network), without keeping a copy of it, while the req_to_be_sent variable may be decremented by one 437.

In one embodiment, if all acknowledged reservations have expired, it may be checked 423 as to whether there are any pending, reservations. If yes, then the queue may not enter the "opportunistic transmission" state yet, and hence no further action may be performed. The reason is that otherwise, the FIFO order might be violated. For example, a burst may be transmitted opportunistically, and just after that an ACK may be received (e.g., for a REQ sent even before entering the "guaranteed transmission state" (e.g., during the previous "no transmission" state)). Then, bursts may begin to be transmitted in the "guaranteed transmission" state. However, if some of the bursts transmitted during the "opportunistic transmission" state have failed, they may be eventually retransmitted, hence violating the arrival order. It is evident that the worst-case stalling (e.g., before entering the "opportunistic" state) because of this way of operation may be rtt-rsrv, whereby rtt denotes the CMP round-trip time to the destination OEN and back (including O-E-O conversions and processing) and rsrv denotes the reservation duration (e.g., end time-start time). This may correspond to the case when a REQ was sent just before an ACK was received.

In one embodiment, if there are no pending reservations, it may be checked 426 as to whether the opportunistic transmission mode is enabled (e.g., as indicated by the current value of the boolean opp_tx_enabled parameter). In general, it may be expected that opp_tx_enabled may be set 430 to "true" in cases when small burst contention is expected to occur for a queue (e.g., when average offered load is low). In that respect, the parameter may be updated periodically based on statistics collected by a centralized controller 108, as shown in FIG. 1. If opportunistic transmission mode is enabled, then the oldest "original" (which, in this case, may be a burst for which no REQ has been sent) from the FIFO queue may be moved to the corresponding optical transmitter, while a copy of it may be marked as such, may remain in the queue 438, and the req_to_be_sent variable may be decremented by one 437.

On the other hand, in one embodiment, if opportunistic transmission mode is not enabled (e.g., opp_tx_enabled is "false"), then the controller may try to reserve resources anew, beginning from the local scheduling (since there may be contention with other queues of the same OEN). First, it may attempt to perform scheduling, taking into account all other reservations (even if they have already expired) 427. This step may be taken as a measure towards preserving expired reservations as much as possible before releasing them. If this scheduling attempt is not successful 431, then another attempt may be made 435, and this time the attempt may ignore expired reservations 439. If the latter attempt is successful, the expired reservations overlapping with the currently performed one may be removed 440, and corresponding RELEASE messages may be sent 436. If either of the scheduling attempts 427, 435 is successful, the corresponding reservation may be added 432, the req_to_be_sent variable may be decremented by one 428, the req_pending may be incremented by one 424, and a REQ message may be sent 422 in order to reserve resources across the complete path to the destination OEN. If both scheduling attempts fail, no further actions may be performed at this stage.

It noted that the present principles allow each OEN to independently configure the duration (measured in bursts) of the established connections for each of its burst queues. This feature enables Quality of Service (QoS) differentiation between different OENs, and also individual burst queues. For example, in some embodiments, some queues could be allowed to establish connections corresponding to multiple bursts upon each burst arrival, thus ensuring longer "guaranteed transmission" intervals. At the same time, other queues could establish connections lasting just long enough to host only a single guaranteed burst transmission according to some embodiments.

It is noted that although the above configurations and combination of steps are illustratively depicted, it is contemplated that other sorts of configurations and combination of steps may also be employed according to the present principles.

Figure 5:
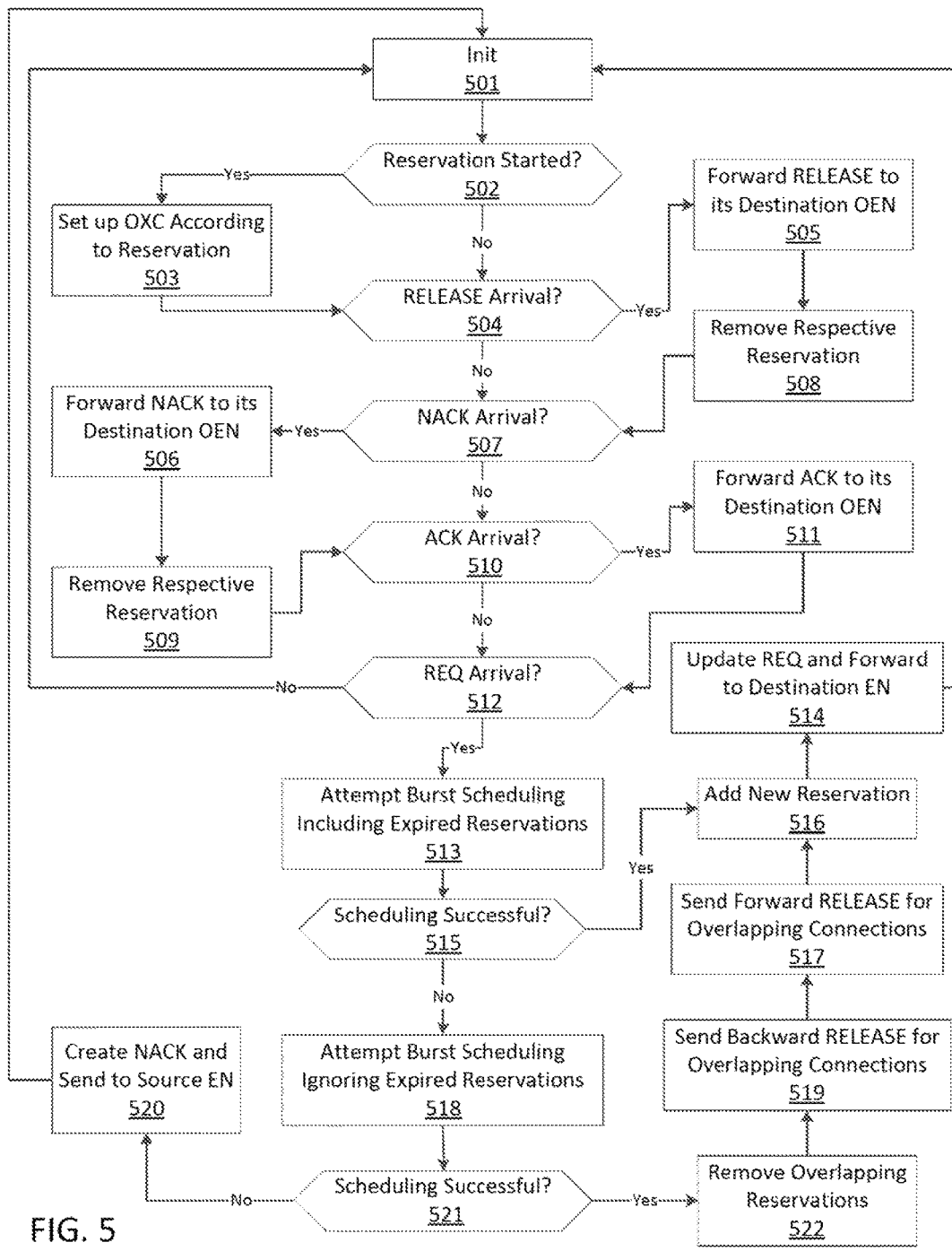
FIG. 5 is a high level block/flow diagram illustratively depicting the operation of an Optical Switching Node (OSN) in accordance with the present principles.

Referring now to FIG. 5, a high level block/flow diagram illustratively depicting the operation of an OSN node is shown according to one embodiment of the present principles. This block/flow diagram includes the basic checks and actions that may be performed by the OSN controller according to one embodiment, and is presented here as an infinite loop starting from an "Init" state 501. It may first be checked 502 as to whether the start time for some of the existing reservations has been reached, and if yes, then the OXC may be set up accordingly 503.

In one embodiment, it may next be checked 504 if a RELEASE message has arrived. If yes, the message may be forwarded towards its destination OEN 505, and the reservation for the connection indicated within the RELEASE message may be removed 508. Then, the controller may check whether a NACK message has arrived 507, and if this is the case, the NACK may be forwarded towards its destination OEN 506, and the reservation for the connection indicated within the NACK message may be removed 509. If an ACK has arrived 510, it may be forwarded to its destination OEN 511.

Next, it may be checked 512 whether a REQ message has been received. If this is the case, the controller may attempt to schedule the upcoming burst (based on the information contained in the REQ), first taking into account all reservations 513, including expired ones. The reason is similar to what was described above for step 427. It may then be determined whether the scheduling attempt was successful or not in block 515. If this attempt is not successful, then a new scheduling attempt may be made 518, and may now ignore expired reservations. It may be determined whether reservations have been started in block 521. If the scheduling attempt is successful, the controller may remove all expired reservations that overlap with the newly established one in block 522, and may send RELEASE messages corresponding to the relevant connections, both backwards (e.g., towards the source OEN of each connection) 519 and forwards (e.g., towards the destination OEN of each connection) 517.

In one embodiment, if none of the scheduling attempts are successful, the controller may create and send a relevant NACK message to the source OEN of the REQ in block 520. If either of the scheduling attempts has been successful, then the new reservation may be added to the OSN scheduling log 516, and the REQ message may be updated (e.g., the start and end times may be modified to account for the O-E-O and processing delay of the REQ at this node) and may be sent towards the destination OEN in block 514.

In an illustrative embodiment, the main events (e.g., CMP message creation and distribution, and reservation management) may occur at specific times, and may take place regarding a specific destination queue (e.g., corresponding to OEN node d) at OEN node s, following the assembly of, for example, four consecutive bursts, with local identifiers, denoted as x, x+1, x+2, x+3 and x+4. In one embodiment, as soon as bursts x and x+1 arrive from the assembly unit, REQ messages may be sent (attempting to establish connections s:d:x and s:d:x+1 respectively), since no reservation exists yet for destination d. In other words, the particular queue may be currently at the "no transmission" state.

The REQ message for connection s:d:x may fail at the second OSN node of its path and a NACK may be returned back to node s. This may trigger a new REQ transmission for connection s:d:x, the queue still being in the "no transmission" state. Next, an ACK may be received for connection s:d:x+1 and the queue may enter the "guaranteed transmission" state. In this particular example, the reservation duration may be assumed to be slightly longer than the duration of two bursts. Given the existence of the acknowledged reservation, the two queued bursts x and x+1 may be transmitted in the order they were initially received, although the acknowledged reservation may correspond to the REQ originally triggered by burst x+1. The NACK message which arrives in the meanwhile may not affect the transmission status, since connection s:d:x+1 may still be valid. Burst transmissions may arrive in such a manner that both bursts arrive at node d without any extra delay incurred at intermediate nodes. This is due to the all-optical transmission enabled by using the already established, optical connection.

In one embodiment, after connection s:d:x+1 has expired, a new burst, x+2, may be assembled. It may be assumed in this example that the opportunistic mode may be currently enabled (opp_tx_enabled is "true"), so the burst may be transmitted without the need for establishing a new connection, while a copy of the burst may be kept at the queue. However, in the meanwhile, connection s:d:x+1 may have been overridden by another connection at the second OSN node, and a RELEASE message may have been transmitted. When the RELEASE message arrives at node s, the latter may remove the reservation for s:d:x+1 and, based on the timings of burst x+2 and the RELEASE arrival, may identify that the particular burst needs to be retransmitted (and hence it is no longer marked as a copy).

As a result, a new REQ for connection s:d:x+2 may be sent, and the same may occur when another burst, x+3, arrives (e.g., REQ transmission for connection s:d:x+3). When the ACK for s:d:x+2 arrives, bursts x+2 and x+3 may be transmitted one after the other. The subsequent arrival of an ACK for s:d:x+3 as well may indicate that the "guaranteed transmission" state may be extended until s:d:x+3 has expired. After this happens, a new burst, x+4, may be assembled and it may be transmitted opportunistically (e.g., while again keeping a copy at the queue). However, this time the burst may successfully reaches node d, since the connection may not have been disrupted. After sufficient time (e.g., enough time to ensure that no RELEASE may be expected any more), the copy of burst x+4 may be removed from the queue.

It is noted that although the above configurations and combination of steps are illustratively depicted, it is contemplated that other sorts of configurations and combination of steps may also be employed according to the present principles.

Figure 6:
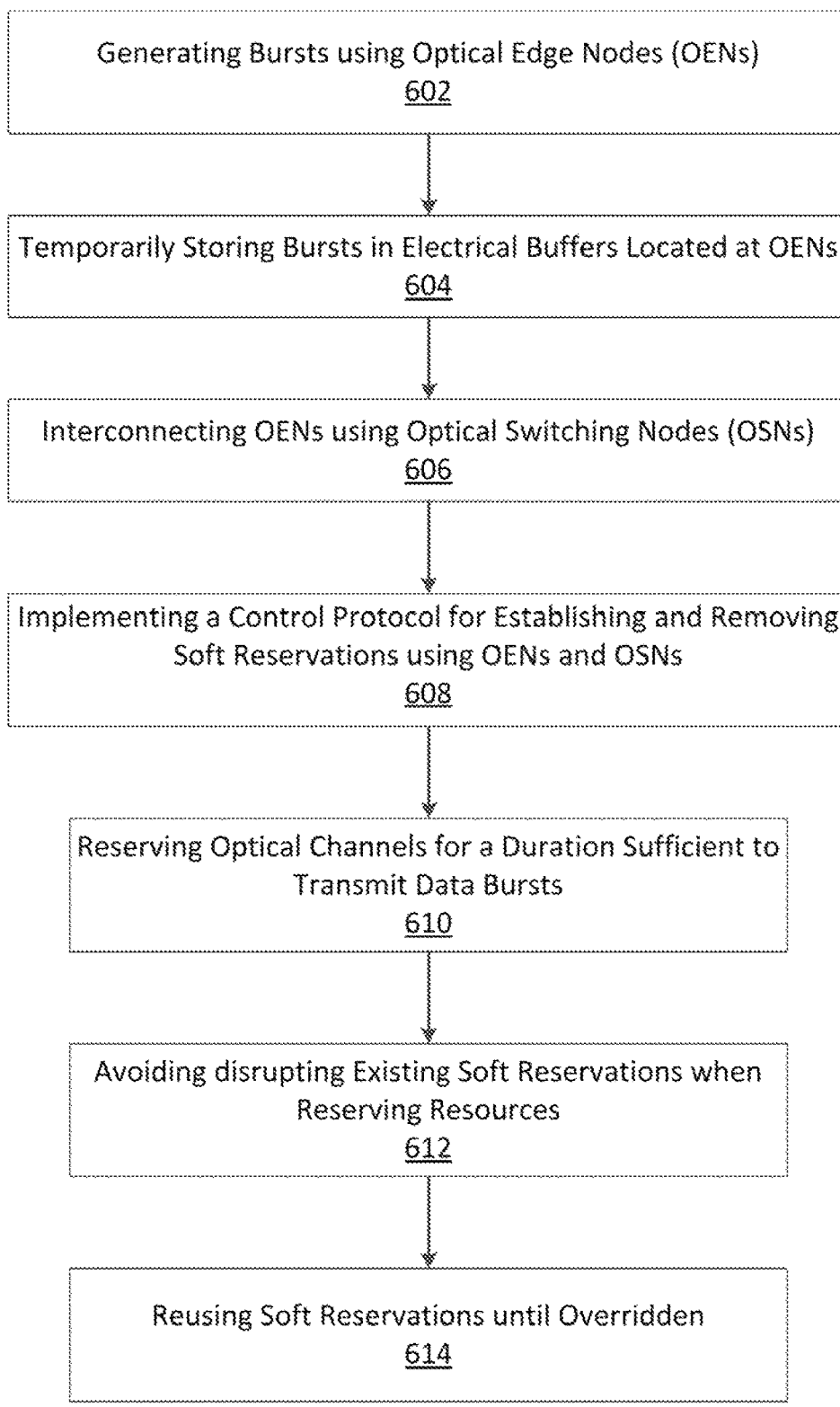
FIG. 6 is a high level block/flow diagram illustratively depicting a system/method for optical burst switching using soft reservations and opportunistic transmission in accordance with the present principles.

Referring now to FIG. 6, a system and method for optical burst switching using soft reservations and opportunistic transmission is illustratively depicted in accordance with the present principles. In one embodiment, fixed-length bursts may be generated using one or more Optical Edge Nodes (OENs) in block 602. The bursts may be temporarily stored in electrical buffers located at the OENs in block 604 wherein the electrical buffers may include one or more burst queues, and one burst queue may be allocated for each of one or more destination OENs. The OENs may be interconnected using one or more Optical Switching Nodes (OENs) in block 606.

A control protocol may be implemented for establishing and removing soft reservations using at least one of the OENs and OSNs in block 608, wherein optical channels may be reserved for a duration long enough to transmit one or more data bursts in block 610, the duration being selected independently for each of the one or more burst queues. The control protocol may give precedence to avoiding disruption of any existing soft reservations when reserving resources in block 612, and the soft reservations may be reused until overridden in block 614.

While the above configuration and steps are illustratively depicted according to one embodiment of the present principles, it is contemplated that other sorts of configurations and steps may also be employed according to the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the an may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for optical switching of time-varying traffic, comprising:
   generating fixed-length bursts using one or more Optical Edge Nodes (OENs);
   temporarily storing the bursts in electrical buffers located at the OENs, wherein the electrical buffers include one or more burst queues, and one burst queue is allocated for each of one or more destination OENs;
   interconnecting OENs using one or more Optical Switching Nodes (OSNs); and
   implementing a control protocol for establishing and removing soft reservations using at least one of the OENs and OSNs, wherein optical channels are reserved for a duration long enough to transmit one or more data bursts, the duration being selected independently for each of the one or more burst queues, wherein the control protocol gives precedence to avoiding disrupting of any existing soft reservations when reserving resources; and wherein the soft reservations are capable of being reused until overridden.

2. The method as recited in claim 1, wherein each of the one or more burst queues alternates between three states, the three states including guaranteed transmission, opportunistic transmission, and no transmission states, wherein the three states determine the capability of the OEN to transmit bursts belonging to a particular burst queue.

3. The method as recited in claim 1, wherein the optical channels are reserved using a REQ message.

4. The method as recited in claim 1, wherein one or more of the bursts is transmitted by one or more of the OENs opportunistically, and wherein the decision to transmit opportunistically is determined by a Boolean system parameter which is different for each of one or more destinations.

5. The method as recited in claim 1, wherein one or more of the existing soft reservations are removed in response to a new reservation request only if the one of more existing soft reservations have expired.

6. The method as recited in claim 3, wherein if a REQ message fails to reserve resources at an OSN node along its path, a NACK message is created towards the source OEN of the connection, and the removal of previously established reservations is triggered by the REQ message in each of the preceding OSNs.

7. The method as recited in claim 4, wherein a copy of each of the opportunistically transmitted bursts is stored in a corresponding burst queue, and remains in the queue until the possibility of a RELEASE message arriving for a connection corresponding to the reservation is eliminated.

8. The method as recited in claim 5, wherein a RELEASE message is sent for each of the one or more expired reservations if the one or more expired reservations overlap with one or more newly established reservations, the RELEASE message triggering the removal of reservations associated with the one or more expired reservations across all intermediate OSNs.

9. The method as recited in claim 8, wherein upon receiving the RELEASE message, the one or more OENs calculate a number of failed opportunistically transmitted bursts, and unmarks copies of the failed bursts in a local queue so the bursts may be retransmitted or trigger new reservations.

10. A system for optical switching of time-varying traffic, comprising:

one or more Optical Edge Nodes (OENs) configured to generate, using a processor, fixed-length bursts;

one or more electrical buffers located at the OENs configured to temporarily store the bursts, wherein the electrical buffers include one or more burst queues, and one burst queue is allocated for each of one or more destination OENs;

one or more Optical Switching Nodes (OSNs) configured to interconnect the OENs; and one or more controllers configured to implement a control protocol for establishing and removing soft reservations using at least one of the OENs and OSNs, wherein optical channels are reserved for a duration long enough to transmit one or more data bursts, the duration being selected independently for each of the one or more burst queues, wherein the control protocol gives precedence to avoiding disrupting of any existing soft reservations when reserving resources; and wherein the soft reservations are capable of being reused until overridden.

11. The system as recited in claim 10, wherein each of the one or more burst queues alternates between three states, the three states including guaranteed transmission, opportunistic transmission, and no transmission states, wherein the three states determine the capability of the OEN to transmit bursts belonging to a particular burst queue.

12. The system as recited in claim 10, wherein the optical channels are reserved using a REQ message.

13. The system as recited in claim 10, wherein one or more of the bursts is transmitted by one or more of the OENs opportunistically, and wherein the decision to transmit opportunistically is determined by a Boolean system parameter which is different for each of one or more destinations.

14. The system as recited in claim 10, wherein one or more of the existing soft reservations are removed in response to a new reservation request only if the one of more existing soft reservations have expired.

15. The system as recited in claim 12, wherein if a REQ message fails to reserve resources at an OSN node along its path, a NACK message is created towards the source OEN of the connection, and the removal of previously established reservations is triggered by the REQ message in each of the preceding OSNs.

16. The system as recited in claim 13, wherein a copy of each of the opportunistically transmitted bursts is stored in a corresponding burst queue, and remains in the queue until the possibility of a RELEASE message arriving for a connection corresponding to the reservation is eliminated.

17. The system as recited in claim 14, wherein a RELEASE message is sent for each of the one or more expired reservations if the one or more expired reservations overlap with one or more newly established reservations, the RELEASE message triggering the removal of reservations associated with the one or more expired reservations across all intermediate OSNs.

18. The system as recited in claim 17, wherein upon receiving the RELEASE message, the one or more OENs calculate a number of failed opportunistically transmitted bursts, and unmarks copies of the failed bursts in a local queue so the bursts may be retransmitted or trigger new reservations.

* * * * *